United States Patent
Blaschke et al.

(10) Patent No.: US 11,353,165 B2
(45) Date of Patent: Jun. 7, 2022

(54) COVERS FOR LED LIGHT SOURCES

(71) Applicant: COVESTRO INTELLECTUAL PROPERTY GMBH & CO. KG, Leverkusen (DE)

(72) Inventors: Ulrich Blaschke, Krefeld (DE); Alexander Meyer, Düsseldorf (DE); Rafael Oser, Krefeld (DE); Michael Roppel, Burscheid (DE); Franky Bruynseels, Sint Gillis-Waas (BE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 16 days.

(21) Appl. No.: 15/733,856

(22) PCT Filed: May 21, 2019

(86) PCT No.: PCT/EP2019/063118
§ 371 (c)(1),
(2) Date: Nov. 30, 2020

(87) PCT Pub. No.: WO2019/228867
PCT Pub. Date: Dec. 5, 2019

(65) Prior Publication Data
US 2021/0222839 A1    Jul. 22, 2021

(30) Foreign Application Priority Data
May 29, 2018   (EP) ..................................... 18174697

(51) Int. Cl.
| | |
|---|---|
| *F21K 9/00* | (2016.01) |
| *F21K 9/275* | (2016.01) |
| *F21V 29/70* | (2015.01) |
| *F21V 29/87* | (2015.01) |
| *F21Y 115/10* | (2016.01) |
| *C08K 5/00* | (2006.01) |
| *C08K 5/01* | (2006.01) |
| *C08K 5/103* | (2006.01) |
| *C08K 5/50* | (2006.01) |
| *C08L 69/00* | (2006.01) |

(52) U.S. Cl.
CPC .............. *F21K 9/275* (2016.08); *F21V 29/70* (2015.01); *F21V 29/87* (2015.01); *C08K 5/005* (2013.01); *C08K 5/01* (2013.01); *C08K 5/103* (2013.01); *C08K 5/50* (2013.01); *C08L 69/00* (2013.01); *C08L 2203/20* (2013.01); *F21Y 2115/10* (2016.08)

(58) Field of Classification Search
CPC .. F21Y 2115/10; C08L 2203/20; C08L 69/00; C08K 5/005; C08K 5/01; C08K 5/103; C08K 5/50; F21K 9/275
See application file for complete search history.

(56) References Cited

U.S. PATENT DOCUMENTS

| | | |
|---|---|---|
| 2,991,273 A | 7/1961 | Wilhelm et al. |
| 2,999,835 A | 9/1961 | Goldberg |
| 2,999,846 A | 9/1961 | Hermann et al. |
| 3,148,172 A | 9/1964 | Fox |
| 3,271,367 A | 9/1966 | Hermann et al. |
| 4,982,014 A | 1/1991 | Freitag et al. |
| 2003/0173546 A1 | 9/2003 | Hiroshi et al. |
| 2008/0085985 A1* | 4/2008 | Nakamura ............... C08L 63/00 528/25 |
| 2010/0256313 A1* | 10/2010 | Nakamura ............... C08L 63/00 525/476 |
| 2016/0280936 A1* | 9/2016 | Takenaka .................. C08F 2/18 |
| 2017/0218198 A1 | 8/2017 | Bahn et al. |
| 2020/0131362 A1* | 4/2020 | Van Der Mee ......... C08L 69/00 |
| 2020/0200945 A1* | 6/2020 | Totani ..................... C08K 5/005 |

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 60116498 T2 | 7/2006 |
| EP | 0500496 A1 | 8/1992 |
| EP | 0839623 A1 | 5/1998 |
| EP | 1570983 A1 | 9/2005 |
| EP | 2652031 A1 | 10/2013 |
| EP | 2799200 A1 | 11/2014 |
| GB | 1122003 A | 7/1968 |
| GB | 1341318 A | 12/1973 |
| JP | 5655657 B2 | 1/2015 |
| WO | 96/15102 A2 | 5/1996 |
| WO | 01/04199 A1 | 1/2001 |
| WO | 2012/080396 A1 | 6/2012 |

OTHER PUBLICATIONS

International Preliminary Report on Patentability received for PCT Patent Application No. PCT/EP2019/063118, dated Dec. 10, 2020, 13 pages (8 pages of English Translation and 5 pages of Original Document).

(Continued)

*Primary Examiner* — Gerald J Sufleta, II
(74) *Attorney, Agent, or Firm* — Faegre Drinker Biddle & Reath LLP

(57) ABSTRACT

The invention relates to the use of branched aliphatic hydrocarbons such as squalane in compositions based on thermoplastic polymer, in particular on polycarbonate, which are used for producing molded parts used in LED lighting units, such as covers for instance. According to the invention it has been found that the use of branched aliphatic hydrocarbons makes it possible to enhance the total transmission and the transmission in the range from 360 to 460 nm, thus making corresponding compositions particularly suitable for producing molded parts for use in combination with white LED light sources. It has additionally been shown that yellowing and haze are simultaneously reduced.

12 Claims, No Drawings

(56) References Cited

OTHER PUBLICATIONS

International Search Report and Written Opinion received for PCT Patent Application No. PCT/EP2019/063118, dated Aug. 5, 2019, 15 pages (7 pages of English Translation and 8 pages of Original Document).

* cited by examiner

COVERS FOR LED LIGHT SOURCES

CROSS-REFERENCE TO RELATED APPLICATIONS

This application is a national stage application (under 35 U.S.C. § 371) of PCT/EP2019/063118, filed May 21, 2019, which claims benefit of European Application No. 18174697.5, filed May 29, 2018, both of which are incorporated herein by reference in their entirety.

The invention relates to an LED illumination unit, comprising an LED light source and a molded part, for instance a cover, made of thermoplastic material. The invention further relates to improving the light transmission of the cover material in the range from 360 to 460 nm.

Incandescent lamps are disadvantageous due to their poor efficiency in terms of light emission and high evolution of heat, and also their short lifetime. Energy-saving lamps are much more energy-efficient, but entail a high level of environmental pollution owing to heavy metal components, especially mercury, and have to be disposed of as special waste. Alternative concepts for conventional illumination sources and modules, for example incandescent lamps or energy-saving lamps, are in demand for reasons of sustainability and energy efficiency.

Semiconductor technology offers an alternative illumination source that does not have these disadvantages and additionally has a long lifetime and high energy efficiency (in the form of an LED, OLED or electroluminescent film). A preferred use of semiconductor technology as a light source is that of LEDs.

Owing to their long lifetime, their low energy consumption and good light yield, LEDs are finding increasing use as illumination sources, for example in the automotive industry, aviation, interior lighting, facade design etc.

Compared to conventional illumination means such as incandescent lamps or fluorescent lamps, LEDs have different emission characteristics. For applications which require guiding of the light beam it is often necessary to use lenses or light conductors for LEDs. Alternatively or in addition, illumination means comprising LEDs as the light source generally comprise a transparent or translucent housing part which serves to cover the light source, protects the light source and shields it from outside influences such as dirt and dust.

LEDs emit light having a wavelength dependent on the semiconductor material and doping, and LEDs may therefore be used to produce virtually monochromatic light, even in the infrared range or UV range.

To generate visible, white light, which is known to be a mixture of different wavelengths, the monochromatic light of the LEDs must therefore be "converted" (for example through additive color mixing), which may in principle be effected by various means:

1. Color mixing through combination of a blue LED, a red LED and a green LED to form so-called RGB (red green blue) modules whose combined perceived light impression is white.

2. Through luminescence techniques, in which all or part of the LED radiation is converted to other wavelengths, for example via phosphors. This makes it possible to produce white light starting from an LED that emits blue light in the visible range through addition of a single phosphor which converts a portion of the radiation in the blue range into red/yellow light. This mode of producing white light is preferred for commercial applications for cost reasons and due to the high efficiency of blue LEDs. It is alternatively possible to produce white light from UV light produced with LEDs using three different phosphors that emit wavelengths corresponding to an RGB module. If this technique is employed, preference is given to compositions which also have elevated stability to UV radiation, i.e. have been provided with UV stabilization for example.

To establish an overall color impression deviating from "white" in the LED modules the above light sources may also be further modified as required. This modifying may be effected for example by:
  combining with a phosphorus dye or
  combining with additional light sources having different emissions characteristics.

When using transparent or translucent plastics for lenses, light guides, covers or other components of an illumination means the focus is on stability to the light from the light source used. The wavelength of the light is preferably in the range visible to the naked eye since these illumination means are conceived for use by humans. Emission outside the visible range entails a loss of energy and thus a reduced efficiency of the light source. There is a need for a transparent or translucent plastic composition having a high color stability and a high transmission with respect to the emission spectrum of such a light source. This means that especially absorption in the range between 360 and 460 nm—blue light—in which many LED light sources emit most light must be low since every absorption in this range leads to energy input into the material which, over longer periods, results in discoloration, clouding and in some cases polymer degradation. In the case of a thermoplastic polymer composition the production of such components additionally requires good flowability in order to be able to manufacture complex geometries easily. Such components are often intended to be connectable to the further elements of the illumination means via integrated elements such as for example snap or screw connections and therefore require good mechanical strength. Good heat resistance is also required in order to permanently withstand the usage temperatures of the illumination means without alteration to optical, geometric or other properties.

Lenses, light guides, transparent or translucent covers and other transparent or translucent components in illumination means may in principle be produced from a very wide variety of transparent or translucent polymers. Suitable examples include in particular injection-mouldable transparent or translucent materials based on the following thermoplastics: aromatic polycarbonate (PC), including copolycarbonate, polyestercarbonate, polystyrene (PS), styrene copolymers, polyalkylenes such as polyethylene (PE) and polypropylene (PP), aromatic polyesters such as polyethylene terephthalate (PET) and polybutylene terephthalate (PBT), PET-cyclohexanedimethanol copolymer (PETG), polyethylene naphthalate (PEN), poly- or copolymethyl methacrylates such as polymethyl methacrylate (PMMA), polyimides (for example PMMI), polyethersulfones, thermoplastic polyurethanes, cyclic olefin polymers or copolymers (COP or COC) or mixtures of the recited components provided these mixtures are transparent or translucent.

Such transparent or translucent materials are often mixed with additional colorants to change the color impression or the color temperature of the light.

EP 2799200 A1 describes stabilizers and other additives for improving light transmission. Certain stabilizers such as phosphorus-based antioxidants and phenolic radical scavengers have long been used to improve optical properties. However, the improvement in transmission is very limited here.

US 2017/0218198 A1 describes the addition of polyoxamethylene polyoxapropylene glycols to polycarbonate in order to increase light transmission. However, such glycol ethers have only limited temperature stability. Processing at high temperatures as is customary for polycarbonate may result in the occurrence of degradation products which are deposited in the mold for example. These deposits result in lengthier cleaning cycles which is undesired. In the present case compositions according to the invention are therefore preferably also free from polyoxamethylene polyoxapropylene glycols.

Color-corrected molding materials advantageous for LED and light conductor applications are described in EP 2652031 A1. However, such colorant compositions reduce transmission in the range from 360 to 460 nm.

The present invention has for its object to provide thermoplastic compositions for LED applications which have a high light transmission at least in the range between 360 and 460 nm and a high heat stability expressed in the form of a low ΔY.I value compared to the corresponding additive-free polycarbonate. The molding materials should preferably be readily processable into the desired components, especially into those having a relatively complex geometry.

It has surprisingly been found that the addition of very small amounts of aliphatic hydrocarbons in conjunction with a phosphorus-based heat stabilizer and a demoulding agent based on a fatty acid ester improves both the light transmission and the yellowness index (Y.I.) of polycarbonate. This was surprising since the addition of aliphatic additives to polycarbonate as a demoulding agent is known. However, it is not known that such additives increase the transmission for LED light.

The prior art describes the addition of these specific additives in WO 2001/004199 A1 but not in the inventive additive combination. The increase in light transmission, especially in the range from 360 to 460 nm, is not described.

The object of the present invention is surprisingly achieved by an LED illumination unit comprising an LED light source having a peak wavelength in the range from 360 to 460 nm and a molded part made of a transparent or translucent thermoplastic composition containing
a) thermoplastic polymer, including polymer mixture, preferably comprising aromatic polycarbonate, particularly preferably aromatic polycarbonate produced by the interfacial process,
b) 10-2500 ppm of one or more phosphorus-based stabilizers, selected from the group consisting of phosphates, phosphites, phosphonites, phosphines and mixtures thereof,
c) 200 ppm to 4500 ppm of one or more branched aliphatic hydrocarbons,
d) 100 ppm to 4000 ppm of one or more demolding agents based on a fatty acid ester,
e) 0 to 1000 ppm of one or more phenolic antioxidants,
f) 0 ppm to 6000 ppm of one or more UV absorbers and
g) 0 ppm to 500 000 ppm of one or more further additives,
wherein the reported amounts in ppm are in each case based on the total weight of thermoplastic polymer of component a).

The light emitted by the LED illumination unit preferably has a color temperature determined according to DIN EN 12665:2009 of 2500 K to 7000 K, more preferably of 2700 K to 6500 K, yet more preferably of 3000 to 6000 K.

The object is further achieved by the use of branched aliphatic hydrocarbons, in particular of squalane, in conjunction with one or more phosphorus-based heat stabilizers and one or more demolding agents based on a fatty acid ester to increase the light transmission in the range from 360 to 460 nm of a thermoplastic composition based on a thermoplastic polymer. The term "based on" is preferably to be understood as meaning that the thermoplastic polymer makes up at least 50% by weight, more preferably at least 60% by weight, yet more preferably at least 70% by weight, yet more preferably at least 80% by weight, yet more preferably at least 90% by weight, especially preferably at least 95% by weight, of the total composition.

The composition of the molded part may in principle contain further components provided that these do not have a negative effect on the compositions according to the invention.

However, it is preferable when the compositions contain no further components in addition to the components a) to g), more preferably a) to f), particularly preferably in addition to the components a) to d).

In the context of the invention "transparent compositions" are those having a transmission in the range from 360 nm to 780 nm measured at a thickness of 4 mm according to ISO 13468-2:2006 of at least 85%, preferably of at least 86%, particularly preferably of at least 88%, and a clouding of less than 2.0%, preferably less than 1.5%, more preferably less than 1.0%, especially preferably less than 0.8%, determined according to ASTM D1003:2013 at a layer thickness of 20 mm. In the context of the present invention "translucent" is to be understood as meaning compositions having a transmission in the range from 360 nm to 780 nm measured at a thickness of 4 mm according to ISO 13468-2:2006 of less than 84% and more than 20%, more preferably of less than 80% and more than 50% and/or a clouding of more than 98% determined according to ASTM D1003:2013 at a layer thickness of 20 mm.

"LED lighting unit" is used here not only in the narrow sense of a package of mechanically joined individual parts but also more broadly as a mere combination of individual parts joined (merely) in a functional sense to form a unit. However, a mechanically joined combination may likewise be concerned.

In the context of the present invention an "LED light source" is to be understood as meaning a light source emitting light having radiation characteristics where more than 70% of the intensity emitted in the range from 200 nm to 3000 nm is in the visible range of the spectrum. In the context of the present invention the visible range is defined as the wavelength range from 360 nm to 780 nm. It is especially preferable when less than 5% of the intensity is in the range <360 nm. When considering the range from 360 nm to 500 nm the LED light in the context of the present invention has a peak wavelength in terms of its intensity—i.e. wavelength of maximum intensity—of 360 nm to 460 nm, more preferably of 400 nm to 460 nm, and particularly preferably of 430 nm to 460 nm, alternatively particularly preferably of 400 nm to 405 nm. To determine the peak wavelength a radiation-equivalent parameter, for example radiation flux, is measured with spectral resolution and plotted in a Cartesian coordinate system. On the y axis is plotted the radiation-equivalent parameter and on the x axis the wavelengths. The absolute maximum of this curve is the "peak wavelength" (definition according to DIN 5031-1 (1982)). The term "from . . . to" includes the specified threshold values. The "LED light" preferably has a narrow emission width with a full width at half maximum of not more than 60 nm, more preferably of not more than 45 nm, yet more preferably of not more than 30 nm, wherein monochromatic light is particularly preferred. The full width at half maximum is the full width of an emission peak at half intensity.

Such emission characteristics are achieved inter alia by the use of semiconductors or lasers as a light source. Today, semiconductor technology is in frequent use, for example in LEDs (light-emitting diodes), organic LEDs (OLEDs) and electroluminescent films.

"Molded part made of" is not exclusively to be understood as meaning only single-layer elements. Multilayer systems are also contemplated provided they comprise a molded part made of a corresponding composition. Additional scratch-resistant layers, on one or both sides of the molded part described according to the invention, may especially be present. The multilayer article that may be present is not to be equated with the term "molded part". The invention thus further relates to corresponding LED illumination units comprising a multilayer article comprising a layer consisting of the more particularly defined composition.

Component a

The thermoplastic polymer a) is preferably aromatic polycarbonate (PC), either homopolycarbonate or copolycarbonate, polyester carbonate, polystyrene (PS), styrene copolymers, a polyalkylene such as polyethylene (PE) and polypropylene (PP), an aromatic polyester such as polyethylene terephthalate (PET) and polybutylene terephthalate (PBT), PET-cyclohexanedimethanol copolymer (PETG), polyethylene naphthalate (PEN), a poly- or copolymethyl methacrylate such as polymethyl methacrylate (PMMA), a polyimide (for example PMMI), a polyethersulfone, a thermoplastic polyurethane, a cyclic olefin polymer or copolymer (COP or COC), more preferably aromatic (homo) polycarbonate, aromatic copolycarbonate, aromatic polyester, cyclic olefin polymer or copolymer or polymethyl methacrylate, or mixtures of the recited components, either of the same type or of different types, provided these mixtures are transparent or translucent. The thermoplastic polymer of component a) is particularly preferably aromatic polycarbonate, wherein mixtures of two or more representatives of this type, for example two different aromatic copolycarbonates or two different aromatic homopolycarbonates, may also be concerned. When component a) is a mixture of different types of thermoplastic polymer it is preferably a mixture of polycarbonate with PMMA or polyester. However it is exceptionally preferable when only aromatic polycarbonate is present as thermoplastic polymer.

One embodiment contains as component a) a mixture of aromatic polycarbonate and PMMA comprising less than 2% by weight, preferably less than 1% by weight, more preferably less than 0.5% by weight, yet more preferably comprising 0.15% to 0.25% by weight and particularly preferably comprising 0.08% to 0.12% by weight of PMMA based on the total composition, wherein the PMMA preferably has a molar weight <40 000 g/mol determined by gel permeation chromatography using polystyrene standards and tetrahydrofuran as eluent at a flow rate of 1.0 ml/min.

In the context of the present invention the term polycarbonates comprises both homopolycarbonates and copolycarbonates. The polycarbonates may be linear or branched in known fashion. Where reference is made to "polycarbonates" in the context of the present invention this is always to be understood as meaning aromatic polycarbonates even if not explicitly mentioned.

The polycarbonates are produced in known fashion from diphenols, carbonic acid derivatives, optionally chain terminators and branching agents.

Particulars pertaining to the production of polycarbonates are disclosed in many patent documents spanning approximately the last 40 years. Reference may be made here for example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718, and finally to Dres. U. Grigo, K. Kirchner and P. R. Müller "Polycarbonate [Polycarbonates]" in Becker/Braun, Kunststoff-Handbuch [Plastics handbook], Volume 3/1, Polycarbonate, Polyacetale, Polyester, Celluloseester [Polycarbonates, polyacetals, polyesters, cellulose esters], Carl Hanser Verlag Munich, Vienna 1992, pages 117-299.

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulfides, bis (hydroxyphenyl) ethers, bis(hydroxyphenyl) ketones, bis (hydroxyphenyl) sulfones, bis(hydroxyphenyl) sulfoxides, alpha-alpha'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl) phenylethane, 1,3-bis[2-(4-hydroxyphenyl)-2-propyl] benzene (bisphenol M), 1,1-bis(4-hydroxyphenyl)-p-diisopropylbenzene, 2,2-bis(3-methyl-4-hydroxyphenyl) propane, 2,2-bis(3-chloro-4-hydroxyphenyl)propane, bis(3, 5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene, 2,2-bis(3,5-dichloro-4-hydroxyphenyl)propane, 2,2-bis(3,5-dibromo-4-hydroxyphenyl)propane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC) and the bisphenols of formulae (I) to (III)

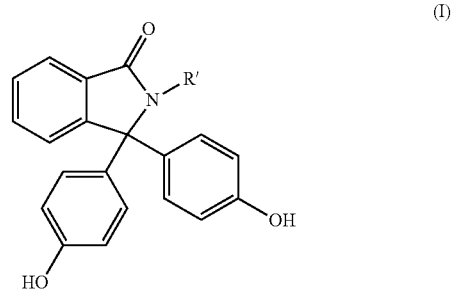

(I)

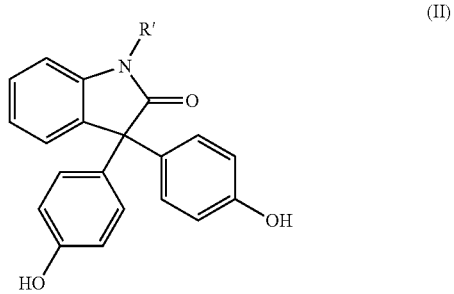

(II)

-continued

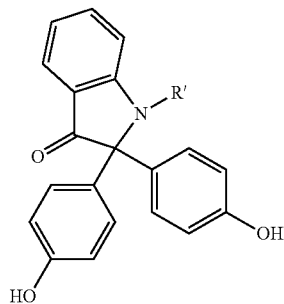
(III)

in which R' in each case represents a $C_1$- to $C_4$-alkyl radical, aralkyl radical or aryl radical, preferably a methyl radical or phenyl radical, most preferably a methyl radical.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the dihydroxyaryl compounds of formulae (I), (II) and/or (III).

These and other suitable dihydroxyaryl compounds are described for example in U.S. Pat. Nos. 2,999,835 A, 3,148,172 A, 2,991,273 A, 3,271,367 A, 4,982,014 A and 2,999,846 A, in German laid-open specifications 1 570 703 A, 2 063 050 A, 2 036 052 A, 2 211 956 A and 3 832 396 A, in the French patent specification 1 561 518 A1, in the monograph "H. Schnell, Chemistry and Physics of Polycarbonates, Interscience Publishers, New York 1964, p. 28ff and p. 102ff", and in "D. G. Legrand, J. T. Bendier, "Handbook of Polycarbonate Science and Technology", Marcel Dekker New York 2000, pp. 72ff.

In the case of homopolycarbonates, only one diphenol is employed, and in the case of copolycarbonates, two or more diphenols are employed.

Examples of suitable carbonic acid derivatives include phosgene or diphenyl carbonate.

Suitable chain terminators employable in the production of the polycarbonates include both monophenols and monocarboxylic acids. Suitable monophenols are for example phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol and mixtures thereof.

Preferred chain terminators are moreover phenols which are mono- or polysubstituted with linear or branched $C_1$ to $C_{30}$ alkyl radicals, preferably unsubstituted or substituted with tert-butyl. Particularly preferred chain terminators are phenol, cumylphenol and/or p-tert-butylphenol.

Suitable monocarboxylic acids are moreover benzoic acid, alkylbenzoic acids and halobenzoic acids.

The amount of chain terminator to be employed is preferably 0.1 to 5 mol % based on moles of diphenols employed in each case. The addition of the chain terminators may be carried out before, during or after the reaction with a carboxylic acid derivative.

Suitable branching agents are the trifunctional or more than trifunctional compounds known in polycarbonate chemistry, in particular those having three or more than three phenolic OH groups.

Suitable branching agents are for example phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri (4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)orthoterephthalate, tetra(4-hydroxyphenyl) methane, tetra(4-(4-hydroxyphenylisopropyl)phenoxy) methane and 1,4-bis((4',4"-dihydroxytriphenyl)methyl)benzene and 2,4-dihydroxybenzoic acid, trimesic acid, cyanuric chloride and 3,3-bis(3-methyl-4-hydroxyphenyl)-2-oxo-2,3-dihydroindole.

The amount of the branching agents for optional use is preferably 0.05 mol % to 2.00 mol % in turn based on moles of diphenols used in each case.

The branching agents can either be initially charged with the diphenols and the chain terminators in the aqueous alkaline phase or added dissolved in an organic solvent before the phosgenation. In the case of the transesterification process the branching agents are employed together with the diphenols. The aromatic polycarbonates present in the compositions according to the invention are preferably produced by the interfacial process.

It is preferable to employ linear polycarbonates.

The aromatic polycarbonates of the present invention preferably have weight-average molecular weights $M_w$ between 15 000 and 25 000 g/mol, preferably between 15 000-24 000 g/mol, more preferably between 16 000-23 500 g/mol, yet more and particularly preferably between 18 000-22 500 g/mol. The values apply to determination by gel permeation chromatography using dichloromethane as eluent, calibration with linear polycarbonates (composed of bisphenol A and phosgene) of known molar mass distribution from PSS Polymer Standards Service GmbH, Germany; calibration according to method 2301-0257502-09D (2009 German Edition) from Currenta GmbH & Co. OHG, Leverkusen.

The eluent for the calibration is likewise dichloromethane. Column combination of crosslinked styrene divinylbenzene resins. Diameter of analytical columns: 7 5 mm; length: 300 mm. Particle sizes of column material: 3 µm to 20 µm. Concentration of solutions: 0.2% by weight. Flow rate: 1.0 ml/min, temperature of solutions: 30° C. Detection using a refractive index (RI) detector.

The MVR value of the aromatic polycarbonate measured according to ISO 1133:2012-03 at 300° C. and 1.2 kg is preferably 14 to 70 $cm^3$/(10 min), more preferably 18 to 65 $cm^3$/(10 min).

The reported $M_w$ and MVR values are based on the aromatic polycarbonates present in the composition in their entirety Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Component b

Suitable phosphorus-based stabilizers include inter alia heat stabilizers selected from the group of phosphates, phosphites, phosphonites, phosphines and mixtures thereof.

It is also possible to employ mixtures of different compounds from one of these subgroups, for example two phosphonites.

Examples of suitable phosphorus-based stabilizers include triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite (Irgafos® 168), diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tertbutyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, bis(2,6-di-tert-butyl-4-methylphenyl)pentaerythritol diphosphite (PEP-36), 5-butyl-5-ethyl-2-(2,4,6-tri-tert-butylphenoxy)-1,3,2-dioxaphosphirane, triphenylphosphine (TPP), trialkylphenylphosphine, bisdiphenylphosphinoethane or a trinaphthylphosphine. It is especially preferable to employ triphenylphosphine (TPP), Irgafos® 168 (tris(2,4-di-tert-butylphenyl) phosphite), PEP-36 (bis(2,6-di-tertbutyl-4-methylphenyl) pentaerythritol diphosphite) or tris(nonylphenyl) phosphite, or mixtures thereof. Very particularly preferred as a phosphorus-containing stabilizer, alone or in combination, is triphenylphosphine.

Phosphate stabilizers in the context of the present invention are for example phosphates of formula (I)

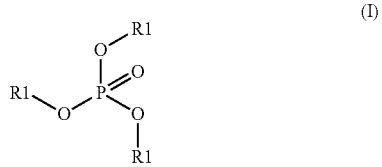

wherein the radicals R1 independently of one another represent branched alkyl radicals and/or optionally substituted alkyl radicals, wherein the alkyl radical is preferably a $C_1$- to $C_{18}$-alkyl radical, more preferably a $C_1$- to $C_8$-alkyl radical. The aryl radical is preferably substituted with linear $C_1$- to $C_8$-alkyl, branched $C_1$- to $C_8$-alkyl, or cumyl, wherein the substituents may be identical or different but identical substituents are preferred. It is preferable when the aryl radicals are substituted in positions 2 and 4 or 2, 4 and 6. Tert-butyl substituents in these positions are very particularly preferred. It is more preferable when all R1 are identical. It is preferable when triisooctyl phosphate is employed as a phosphorus-based stabilizer alternatively or in addition.

The total amount of phosphorus-based stabilizers in the composition is 10-2500 ppm, preferably 20 ppm to 2000 ppm, more preferably 100 ppm to 1500 ppm, particularly preferably 200 ppm to 1000 ppm, very particularly preferably 200 to 300 ppm based on the total weight of the thermoplastic polymer of component a).

Component c

Component c is one or more branched aliphatic hydrocarbons. These are of natural or synthetic origin. The hydrocarbons preferably have pendant alkyl groups, for instance methyl, ethyl, propyl, isobutyl or butyl groups, particularly preferably methyl groups. The number of carbon atoms present in a hydrocarbon of component c employed according to the invention is preferably 20 to 80, more preferably 25 to 40.

When methyl groups are present as branchings the carbon atoms of the methyl groups have a weight fraction based on the total molecule of preferably 10% to 30% by weight.

The hydrocarbons of component c are preferably constructed, formally or by actual synthesis, from hydrogenated polyterpenes, more preferably isoprene units, to an extent of 50 to 100 mol %. The proportion of the hydrogenated isopropene units is more preferably more than 90 mol %, yet more preferably more than 95 mol %, based on the overall molecule of the compound of component c.

Comonomers formally present or actually employed in addition to the isoprene are those customary in rubber production and polyolefin chemistry, especially 2,3-dimethylbutadiene, butadiene, propene and/or isobutene.

Particular preference is given to such saturated aliphatics as are formed from isoprene purely arithmetically before saturation of the remaining double bonds via "head to head" or "head to tail" or "tail to tail" coupling, wherein both coupling types may also take place simultaneously. It is very particularly preferable when the hydrocarbon is constructed from coupled farnesane units, especially from the "tail to tail" coupled farnesane units, and is especially squalane, hydrogenated lycopene or octamethyldotriacontane.

It is very particularly preferable when component c in the compositions employed according to the invention comprises squalane (2,6,10,15,19,23-hexamethyltetracosane); it is exceptionally preferable when component c) is squalane.

The total amount of component c is 200 ppm to 4500 ppm, preferably up to 4000 ppm, more preferably up to 3500 ppm, yet more preferably 400 ppm to 3000 ppm, particularly preferably 500 ppm to 2500 ppm, very particularly preferably 1000 ppm to 2000 ppm, based on the total weight of the thermoplastic polymer of component a.

Component d

Component d are demoulding agents based on a fatty acid ester. Such demoulding agents are especially pentaerythritol tetrastearate and glycerol monostearate. Preferably present as demoulding agent is a glycerol ester of fatty acid, more preferably a glycerol monoester. It is particularly preferable when glyceryl monostearate is present as demoulding agent. It is very particularly preferable when no further demoulding agent based on a fatty acid ester is present in the compositions according to the invention in addition to these preferred representatives of component d.

The term "based on a fatty acid ester" is not to be understood strictly to mean that the compounds are based on only a single fatty acid ester. All that is important is that the demolding agents are based on fatty acid esters; these may also be mixtures of different fatty acid esters.

The total amount of component d) is 100 ppm to 4000 ppm, preferably 120 to 1000 ppm, more preferably 150 ppm to 800 ppm, yet more preferably 150 ppm to 500 ppm, based on the total weight of thermoplastic polymer of component a.

Component e

Phenolic antioxidants may optionally be employed in an amount of up to 1000 ppm, preferably 50 ppm to 800 ppm, more preferably 75 ppm to 700 ppm, yet more preferably 100 ppm to 500 ppm, for example alkylated monophenols, alkylated thiooalkylphenols, hydroquinones and alkylated hydroquinones. It is preferable to employ Irganox® 1010 (pentaerythritol-3-(4-hydroxy-3,5-di-tertbutylphenyl)propionate; CAS No.: 6683-19-8) and/or Irganox 1076® (2,6-di-tert-butyl-4-(octadecanoxycarbonylethyl)phenol; CAS No.: 2082-79-3). It is particularly preferable to employ Irganox 1076® (2,6-di-tert-butyl-4-(octadecanoxycarbonylethyl) phenol).

In a specific embodiment of the present invention a phosphine compound of component b is employed in conjunction with a phosphite of component b or a phenolic antioxidant of component e or a mixture of the two last-named compounds.

In a particularly preferred embodiment the stabilizer system of components b and e consists of triphenylphosphine, a mixture of triphenylphosphine and a phenolic antioxidant such as Irganox® 1076 or Irganox® 1010 and/or a combination of phenolic antioxidant and phosphite, preferably a mixture of Irganox® 1076 and Irganox® 1010 and Irgafos® 168 or PEP-36. In a further particularly preferred embodiment the stabilizer system consists of a phosphine, a phosphite and a phenolic antioxidant, for example triphenylphosphine, Irganox® 1076 and Irgafos® 168.

Component f

The UV absorbers as component f of the present invention are compounds having a lowest possible transmission below 400 nm and a highest possible transmission above 400 nm. Such compounds and their production are known from the literature and described for example in EP 0 839 623 A1, WO 1996/15102 A2 and EP 0 500 496 A1. Ultraviolet absorbers which are preferred for use in the composition according to the invention are benzotriazoles, especially hydroxybenzotriazoles, triazines, benzophenones and/or arylated cyanoacrylates.

The following ultraviolet absorbers are particularly suitable: hydroxybenzotriazoles, such as 2-(3',5'-bis(1,1-dimethylbenzyl)-2'-hydroxyphenyl)benzotriazole (Tinuvin® 234, BASF SE, Ludwigshafen), 2-(2'-hydroxy-5'-(tert-octyl) phenyl)benzotriazole (Tinuvin® 329, BASF SE, Ludwigshafen), bis(3-(2H-benzotriazolyl)-2-hydroxy-5-tert-octyl)methane, (Tinuvin® 360, BASF SE, Ludwigshafen), (2-(4,6-diphenyl-1,3,5-triazin-2-yl)-5-(hexyloxy)phenol (Tinuvin® 1577, BASF SE, Ludwigshafen), the benzophenones 2,4-dihydroxybenzophenone (Chimasorb® 22, BASF SE, Ludwigshafen) or 2-hydroxy-4-(octyloxy)benzophenone (Chimassorb® 81, BASF SE, Ludwigshafen), 2-cyano-3,3-diphenyl-2-propenoic acid, 2,2-bis[[(2-cyano-1-oxo-3,3-diphenyl-2-propenyl) oxy]methyl]-1,3-propanediyl ester (9CI) (Uvinul® 3030, BASF SE Ludwigshafen), 2-[2-hydroxy-4-(2-ethylhexyl)oxy]phenyl-4,6-di(4-phenyl)phenyl-1,3,5-triazine (CGX UVA 006, BASF SE, Ludwigshafen) or tetraethyl 2,2'-(1,4-phenylenedimethylidene)bismalonate (Hostavin® B-Cap, Clamant AG). It is also possible to use mixtures of these ultraviolet absorbers.

Very particularly preferred UV absorbers are Tinuvin® 360, Tinuvin® 329, Hostavin® B-Cap, Uvinul® 3030, particularly preferably Tinuvin® 329 and Hostavin® B-Cap.

The total amount of UV absorbers is 0 ppm to 6000 ppm, preferably 500 ppm to 5000 ppm, more preferably 1000 ppm to 2000 ppm, based on the total weight of thermoplastic polymer.

Component g

In addition to the recited stabilizers the polymer compositions according to the invention may optionally also contain further customary polymer additives as component g, as described for example in EP 0 839 623 A1, WO 1996/15102 A2, EP 0 500 496 A1 or in "Plastics Additives Handbook", Hans Zweifel, 5th Edition 2000, Hanser Verlag, Munich. Further customary additives are antioxidants distinct from component e, demoulding agents distinct from component d, flame retardants, anti-drip agents, stabilizers distinct from component b, optical brighteners, light scattering agents, colorants, in each case in the amounts customary for the respective thermoplastics. It will be appreciated that component g includes only such components as have not yet been described by the additives b to f.

The further polymer additives g are preferably employed in a total amount of 0 ppm to 500 000 ppm, preferably 100 ppm to 100 000 ppm and more preferably 500 ppm to 50 000 ppm, particularly preferably up to 30 000 ppm, in each case based on the amount of thermoplastic polymer of component a. Mixtures of two or more additives are also suitable.

Should colorants be employed in the composition according to the invention it is essential for the added colorants to be resistant to the conditions during operation of the light source, for example to have a high resistance to the incident light, optionally elevated temperature and other conditions prevailing during operation of the light source, and for the colorants to have no relevant absorption in the substrate material in the range of the emission maximum of the light source, i.e. especially in the range from 360 nm to 460 nm or in the conversion range, since such an absorption considerably impairs the efficiency of the illumination means and thus the luminous intensity. Preferably employed colorants are Macrolex® Blue RR, Macrolex® Violet 3R and/or Macrolex® Red EG.

Further additives further include tetramethylene glycol derivatives.

An LED illumination unit preferred according to the invention comprising an LED light source having a peak wavelength in the range from 360 to 460 nm and a molded part made of a transparent or translucent, preferably transparent, thermoplastic composition is one wherein the composition contains a) thermoplastic polymer, wherein aromatic polycarbonate is present as thermoplastic polymer,
b) 10-2500 ppm of one or more phosphorus-based stabilizers, selected from the group consisting of phosphates, phosphites, phosphonites, phosphines and mixtures thereof,
c) 200 ppm to 4500 ppm of one or more branched aliphatic hydrocarbons,
d) 100 ppm to 4000 ppm of one or more demolding agents based on a fatty acid ester,
e) 0 to 1000 ppm of one or more phenolic antioxidants,
f) 0 ppm to 6000 ppm of one or more UV absorbers and
g) 0 ppm to 500 000 ppm of one or more further additives, wherein the reported amounts in ppm are in each case based on the total weight of thermoplastic polymer.

More preferred is an LED illumination unit comprising an LED light source having a peak wavelength in the range from 360 to 460 nm and a molded part made of a transparent or translucent, preferably transparent, thermoplastic composition containing a) thermoplastic polymer, wherein aromatic polycarbonate is present as thermoplastic polymer, b) 10-2500 ppm of one or more phosphorus-based stabilizers, selected from the group consisting of phosphates, phosphites, phosphonites, phosphines and mixtures thereof,
c) 200 ppm to 4500 ppm of one or more branched aliphatic hydrocarbons, wherein squalane is present as branched aliphatic hydrocarbon,
d) 100 ppm to 4000 ppm of one or more demolding agents based on a fatty acid ester,
e) 0 to 1000 ppm of one or more phenolic antioxidants,
f) 0 ppm to 6000 ppm of one or more UV absorbers and
g) 0 ppm to 500 000 ppm of one or more further additives,
wherein the reported amounts in ppm are in each case based on the total weight of thermoplastic polymer of component a.

Particular preference is given to an LED illumination unit comprising an LED light source having a peak wavelength in the range from 360 to 460 nm and a molded part made of a transparent or translucent, preferably transparent, thermoplastic composition consisting of
a) aromatic polycarbonate,
b) 10-2500 ppm of one or more phosphorus-based stabilizers selected from the group consisting of phosphates, phosphites, phosphonites, phosphines and mixtures thereof, wherein component b preferably comprises triphenylphosphine,
c) 200 ppm to 4500 ppm of one or more branched aliphatic hydrocarbons, wherein squalane is present as branched aliphatic hydrocarbon,
d) 100 ppm to 4000 ppm of one or more demolding agents based on the fatty acid ester, wherein component d preferably comprises glycerol monostearate,
e) 0 to 1000 ppm of one or more phenolic antioxidants,
f) 0 ppm to 6000 ppm of one or more UV absorbers and
g) 0 ppm to 50 000 ppm of one or more further additives selected from the group consisting of antioxidants distinct from component e, flame retardants, anti-drip agents, stabilizers distinct from component b, mold release agents distinct from component d, optical brighteners, light scattering agents, colorants,
wherein the reported amounts in ppm are in each case based on the total weight of aromatic polycarbonate of component a.

It is very particularly preferred when the molded part is a lens, a lamp covering and/or a light guide.

In order to ensure sufficient flowability of the thermoplastic composition and thus sufficiently good processability the MVR value of the composition (measured according to ISO 1133:2012-03 at 300° C. and 1.2 kg) should preferably be between 18 cm$^3$/(10 min) and 80 cm$^3$/(10 min), more preferably between 20 cm$^3$/(10 min) and 80 cm$^3$/(10 min), yet more preferably between 30 cm$^3$/(10 min) and 80 cm$^3$/(10 min) and particularly preferably between 32 cm$^3$/(10 min) and 75 cm$^3$/(10 min).

For good mechanical stability of for example lamp coverings or parts in automotive headlights the impact strength of the thermoplastic molding materials, measured according to ISO 179/1eA:2010 at room temperature using test specimens of 3 mm in thickness, are preferably at least 40 kJ/m$^2$, more preferably between 50 kJ/m$^2$ and 130 kJ/m$^2$, yet more preferably between 55 kJ/m$^2$ and 120 kJ/m$^2$ and particularly preferably between 55 kJ/m$^2$ and 80 kJ/m$^2$.

The material should preferably exhibit an elevated heat stability to withstand the elevated temperatures during operation of the illumination unit and thus not lose its precise shape. The Vicat softening temperature, measured according to DIN EN ISO 306:2014 (SON, 120° C./h), is therefore preferably at least 120° C. The Vicat softening temperature is more preferably between 120° C. and 220° C., yet more preferably between 130° C. and 200° C., particularly preferably between 140° C. and 180° C., very particularly preferably between 140° C. and 150° C.

The refractive index of the material measured according to DIN EN ISO 489:1999 Method A is preferably at least 1.400. The refractive index is more preferably between 1.450 and 1.600, yet more preferably between 1.480 and 1.590, particularly preferably between 1.500 and 1.590, very particularly preferably between 1.550 and 1.590.

Methods for producing the polymer compositions employed according to the invention in the LED illumination units are known in principle to those skilled in the art.

Production of the polymer compositions employed according to the invention containing the components a to d and optionally e, optionally f and optionally g is carried out via commonly used incorporation methods by combination, mixing and homogenization of the individual constituents, wherein especially the homogenization preferably takes place in the melt under the influence of shear forces. Combination and mixing is optionally effected prior to melt homogenization using powder pre-mixes. It is also possible to use pre-mixes of pellet materials or pellet materials and powders with the additives according to the invention. It is also possible to use pre-mixes produced from solutions of the mixture components in suitable solvents, wherein homogenization is optionally effected in solution and the solvent is then removed.

It is especially possible here to introduce the additives of the compositions according to the invention by known methods or as a masterbatch. The use of masterbatches is preferred in particular for introduction of any colorants present, wherein especially masterbatches based on the respective polymer matrix are used.

The composition may be combined, mixed, homogenized and subsequently extruded in customary apparatuses such as screw extruders (ZSK twin-screw extruders for example), kneaders or Brabender or Banbury mills. The extrudate may be cooled and comminuted after extrusion. It is also possible to premix individual components and then add the remaining starting materials individually and/or likewise in admixture.

The combining and commixing of a pre-mix in the melt may also be effected in the plasticizing unit of an injection molding machine. In this case, the melt is directly converted into a moulded article in a subsequent step.

It is preferable to use injection molding to produce the molded articles. This has the advantage of a high degree of freedom in shaping.

Molded parts made of the described compositions employed according to the invention preferably have the function of covers, in particular lamp covers, light guides and/or lenses for LED lights in motor vehicles or other lighting applications and are intended for use in combination with LED light, in particular LED light sources having a peak wavelength in the range from 360 to 460 mm and are particularly advantageous provided they are subjected to light from high-performance LEDs.

Possible molded parts are
1. Lenses for focusing and distributing light as required and light guides, especially those in automotive headlights having an LED light source and used as daytime running lights,
2. Light guides, especially those in automotive headlights having an LED light source and used as daytime running lights, 3. Lamps, for example headlight covers, indicator caps other optical
elements in a headlight,
4. Lamps for the interior of home and office buildings and lamps for exterior applications,
for example street lights,
5. Lighting means in flatscreen televisions,
6. Lighting means for displays of electronic devices, for example
calculators, mobile telephones,
7. Automotive parts, such as glazing, body parts and decorative trim parts having LED illumination.

The use of the molded parts as multilayer systems is also of interest. Here, the plastic composition according to the invention is applied in one or more layers to a molded article made of a plastic which is not dyed or is dyed differently or one or more layers are applied to an element/a layer consisting of the plastic composition. Application may be carried out simultaneously with or immediately after the shaping of the molded part, for example by film insert moulding, coextrusion or multicomponent injection moulding. However, application can also take place onto the finished main body, for example by lamination with a film, overmoulding or by coating from a solution. In a multilayer system the molded part is preferably the carrier layer, i.e. the thickest layer.

If desired, the molded part may have a low thickness which is advantageous for sheetlike applications. The thickness may be in the range from 0.5 to 1.5 mm for example. However, thick-walled embodiments are also possible, for example in thick-walled optics having a thickness of 2 to 3 cm. The possibility of placing electronic components, especially the LED light source, directly into depressions in the molded part has various advantages. This especially makes it possible to position the electronic component precisely on the plastic molded part.

A depression in the optical component comprising the molding may be configured such that the top surface of the one or more electronic component(s) terminates virtually flush with the top surface of the molded part. This arrangement has the advantage that an electrical contact between the electronic component(s) and further components and/or electrical conductors may be produced in advantageous fashion.

In addition the transparent or translucent plastic molded part may have on its surface structures having an optical effect for additional control of the light, for example microlenses.

Alternatively to the abovementioned plastic molded article comprising microlenses for focusing and efficiency enhancement, a plastic molded part, including as a plastic film, may also be provided with diffuser properties to create the impression of a "lamp surface" instead of a lamp comprising point sources of light.

If phosphorescent pigments, so-called phosphors, are incorporated into or applied to this plastic molded article or this plastic film, white light may be produced for example when blue LEDs are employed. The use of phosphors thus allows various effects to be achieved.

EXAMPLES

Materials:
PC1: Aromatic polycarbonate from Covestro Deutschland AG having an MVR of about 33 cm$^3$/(10 min) measured at 300° C. and at 1.2 kg load (according to ISO 1133-1: 2012-03) which is based on bisphenol A and terminated with tert-butylphenol. Produced in the interfacial process. The polycarbonate contains 250 ppm of triphenylphosphine and 300 ppm of glycerol monostearate (based on the amount of polycarbonate in the total composition of the respective example). Used for examples V1 to V12 and E13 to E16.
PC2: Aromatic polycarbonate from Covestro Deutschland AG having an MVR of about 34 cm$^3$/(10 min) measured at 300° C. and at 1.2 kg load (according to ISO 1133-1: 2012-03) which is based on bisphenol A and terminated with tert-butylphenol. The polycarbonate contains 250 ppm of triphenylphosphine and 300 ppm of glycerol monostearate (based on the amount of polycarbonate in the total composition of the respective example). Produced in the interfacial process. Used for comparative examples V17 and V18.
PC3: Aromatic polycarbonate from Covestro Deutschland AG having an MVR of about 55 cm$^3$/(10 min) measured at 300° C. and at 1.2 kg load (according to ISO 1133-1: 2012-03) which is based on bisphenol A and terminated with tert-butylphenol. Produced in the interfacial process. The polycarbonate contains 250 ppm of glycerol monostearate (based on the amount of polycarbonate in the total composition of the respective example).
A1: Metablen TP-003 from Mitsubishi Chemical Europe GmbH. Flow assistant for polycarbonate based on a phenyl-substituted methacrylate-styrene-acrylonitrile copolymer.
A2: Disflamoll® TP from Lanxess Deutschland GmbH. Triphenyl phosphate; CAS No. 115-86-6.
A3: Zeonor® 1420R from Zeon Corp., Chiyoda, Japan. Cylcoolefin copolymer (COP).
A4: Dianal BR87 from Mitsubishi Rayon. Polymethyl methacrylate having a molecular weight of about 25 000 g/mol, determined using an Ostwald viscometer by measuring intrinsic viscosity in chloroform at 25° C., and a refractive index of 1.490.
A5: Squalane from Merck KGaA, Darmstadt, Germany. 2,6,10,15,19,23-hexamethyltetracosane; CAS No. 111-01-3.
A6: Dimodan® HAB Veg from DuPont. A glycerol monostearate.
A7: Triphenylphosphine from BASF SE; CAS No. 603-35-0.

Procedure:
Experiments for Producing Specimen Sheets for Optical Measurement (40 mm×38 mm×20 mm), V1 to V12, E13-E16

The polycarbonate raw material PC1 was dried in an dry air dryer at 120° C. for 3 hours. 10 kg of the thus-dried material was then filled into a 25 l vessel, the previously weighed-out additive was added and the mixture was mixed in a tumble mixer for 10 min. The mixing step was omitted for V1.

In the subsequent injection molding the mixture was supplied by the material feed hopper of a Krauss Maffei 80-38 injection molding machine and then injection molded in a multilayer process at a melt temperature of 260° C. Optical specimen sheets having dimensions of 40 mm×38 mm×20 mm were injection molded.

Cycle Times:
premold 213 s; postmold 147 s; total cycle time: 360 s.

Experiments for Producing Specimen Sheets for Optical Measurement (40 mm×38 mm×20 mm) V17 and V18:

The polycarbonate raw material PC2 was dried in an dry air dryer at 120° C. for 3 hours. 10 kg of the thus-dried material was then filled into a 25 l vessel, the previously weighed-out additive was added and the mixture was mixed in a tumble mixer for 10 min. The mixing step was omitted for V18.

In the subsequent injection molding the mixture was supplied by the material feed hopper of a Krauss Maffei 80-38 injection molding machine and then injection molded in a multilayer process at a melt temperature of 260° C. Optical specimen sheets having dimensions of 40 mm×38 mm×20 mm were injection molded.

Cycle Times:

premold 213 s; postmold 147 s; total cycle time: 360 s.

Production of Compounds 19V and E20

Compounding carried out in a Berstorff twin-screw extruder at a melt temperature of 275° C. and an extruder speed of 100 rpm.

The PC3 pellet material was dried under vacuum at 110° C. for 3 hours and then compounded with the additives. A powder mixture was used to disperse the additives. To this end the additives were dispersed in a polycarbonate powder (aromatic polycarbonate from Covestro Deutschland AG having an MVR of about 19 cm$^3$/(10 min) measured at 300° C. and at 1.2 kg load (according to ISO 1133-1:2012-03) which is based on bisphenol A and terminated with tert-butylphenol. This powder is added in an amount of 5% by weight. The additives were added such that the amounts reported hereinbelow resulted.

Additive amounts (based on the amount of polycarbonate in the total composition of the respective example):

V19: 2000 ppm of squalane

E20: 250 ppm of triphenylphosphine (A7) and 2000 ppm of squalane

Production of Test Specimens (60 mm×40 mm×4 mm) for V19, E20

The compounded pellet material was dried under reduced pressure at 120° C. for 3 hours and then processed in an Arburg 370 injection molding machine with an injection unit at a melt temperature of 280° C. and a mold temperature of 80° C. to afford small color specimen sheets having dimensions of 60 mm×40 mm×4 mm (width×height×thickness).

Production of Compounds V21, E22 to E24

Compounding carried out in a Berstorff twin-screw extruder at a melt temperature of 275° C. and an extruder speed of 100 rpm.

The PC1 granulate was dried under vacuum at 110° C. for 3 hours and then compounded with the additives. A powder mixture was used to disperse the additives. To this end the additives were dispersed in a polycarbonate powder (aromatic polycarbonate from Covestro Deutschland AG having an MVR of about 19 cm$^3$/(10 min) measured at 300° C. and at 1.2 kg load (according to ISO 1133-1:2012-03) which is based on bisphenol A and terminated with tert-butylphenol. This powder is added in an amount of 5% by weight. The additives were added such that the amounts reported hereinbelow resulted.

Additive amounts (based on the amount of polycarbonate in the total composition of the respective example):

V21: --

E22: 1000 ppm of squalane

E23: 2000 ppm of squalane

E24: 3000 ppm of squalane

Determination Methods:

Optical Measurement of Small Color Specimen Sheets of 4 mm Thickness and of Cuboids of 20 mm Thickness:

Optical measurement was carried out using a Perkin Elmer Lambda 950 spectrophotometer with a photometer sphere.

The same methods for determining light transmission, yellowness index and haze were used for the cuboids of 40×38×20 mm and for the small color specimen sheets of 60×40×4 mm, Transmission measurements—light transmission (Ty, T)—also at 360 to 460 nm were performed on a Lambda 950 spectrophotometer from Perkin Elmer with a photometer sphere according to ISO 13468-2:2006 (i.e. determination of total transmission by measurement of diffuse transmission and direct transmission). Evaluation was carried out by examination in 5 nm steps.

Yellowness index (Y.I.) was determined according to ASTM E 313-15 (observer: 10°/light type: D65) with a Lambda 950 spectrophotometer from Perkin Elmer with a photometer sphere.

Haze was determined according to ASTM D1003:2013.

The glass transition temperature $T_g$ was measured by DSC in a differential scanning calorimeter (Mettler DSC 3+) at a heating rate of 10 K/min (atmosphere: 50 ml/min of nitrogen) in standard crucibles over a temperature range of 0° C.-280° C. The value determined in the 2nd heating operation was reported. Measurement was carried out according to ISO 11357-2:2014-07

TABLE 1a

| | | | | | | | | |
|---|---|---|---|---|---|---|---|---|
| Processing experiments with PC1 at 260° C., 20 mm cuboids | | | | | | | | |
| Ex. | Additive | Additive concentration A1-A6 (% by wt.) | Ty (%) | ΔTy (%) | ΔT at 380 nm (%) | ΔT at 360-460 nm (%) | ΔYI | YI | ΔHaze (%) |
| 1V | — | — | 88.87 | | | | | 3.13 | |
| 2V | A1 | 0.1 | 88.49 | −0.38 | −1.93 | −26.29 | 0.26 | 3.39 | −0.02 |
| 3V | A1 | 0.2 | 88.71 | −0.16 | −0.75 | −10.06 | 0.03 | 3.16 | 0.02 |
| 4V | A1 | 0.3 | 88.77 | −0.10 | −0.90 | −10.80 | 0.05 | 3.18 | −0.11 |
| 5V | A1 | 0.4 | 88.69 | −0.18 | −2.36 | −31.45 | 0.57 | 3.70 | 0.08 |
| 6V | A2 | 0.1 | 88.57 | −0.30 | −2.49 | −28.68 | 0.15 | 3.28 | −0.06 |
| 7V | A2 | 0.2 | 88.63 | −0.24 | −2.33 | −24.18 | −0.06 | 3.07 | −0.05 |
| 8V | A2 | 0.3 | 88.75 | −0.12 | −1.94 | −17.76 | −0.18 | 2.95 | −0.20 |
| 9V | A2 | 0.4 | 88.84 | −0.03 | −1.74 | −14.48 | −0.18 | 2.95 | −0.40 |
| 10V | A3 | 0.2 | 78.22 | −10.65 | −22.03 | −406.73 | 10.39 | 13.52 | 56.38 |
| 11V | A4 | 0.1 | 88.46 | 0.12* | −2.27* | −28* | 0.49 | 4.13 | −0.04 |
| 12V | A4 | 0.2 | 88.62 | 0.28* | −3.14* | −31* | −0.01 | 3.63 | 0.09 |
| 13E | A5 | 0.1 | 88.89 | 0.02 | 1.84 | 22.19 | −0.09 | 3.04 | −0.39 |

TABLE 1a-continued

Processing experiments with PC1 at 260° C., 20 mm cuboids

| Ex. | Additive | Additive concentration A1-A6 (% by wt.) | Ty (%) | ΔTy (%) | ΔT at 380 nm (%) | ΔT at 360-460 nm (%) | ΔYI | YI | ΔHaze (%) |
|---|---|---|---|---|---|---|---|---|---|
| 14E | A5 | 0.2 | 88.91 | 0.03 | 2.23 | 27.57 | −0.16 | 2.97 | −0.46 |
| 15E | A5 | 0.3 | 88.85 | −0.02 | 2.13 | 24.95 | −0.05 | 3.08 | −0.46 |
| 16E | A5 | 0.4 | 88.88 | 0.00 | 2.39 | 28.72 | −0.12 | 3.01 | −0.37 |

*based on the total composition

TABLE 1b

Processing experiments with PC2 at 260° C., 20 mm cuboids

| Ex. | Additive | Additive concentration A1-A6 (% by wt.) | Ty (%) | ΔTy (%) | ΔT at 380 nm (%) | ΔT at 360-460 nm (%) | ΔYI | YI | ΔHaze (%) |
|---|---|---|---|---|---|---|---|---|---|
| 18V | — | — | 88.34 | | | | | 3.64 | |
| 17V | A6 | 0.08 | 87.48* | −0.86* | −7.47* | −98 | 1.02 | 4.67 | 0.31 |

*based on the total composition

TABLE 2

Processing experiments with PC2 at 260° C., 4 mm small color specimen sheets

| Ex. | Ty (%) | ΔTy (%) | ΔT at 380 nm (%) | ΔT at 360-460 nm (%) | ΔYI | YI | ΔHaze (%) |
|---|---|---|---|---|---|---|---|
| 19V | 89.51 | | | | | 2.10 | |
| E20 | 89.77 | 0.26 | 6.67 | 40.7 | −0.97 | 1.13 | −0.07 |

The Δ values are in each case based on the corresponding value of the reference example 1V; at 10V, 11V and 17V, the Δ values are in each case based on the corresponding value of the reference example 18V.

TABLE 3

$T_g$ values

| Ex. | $T_g$ [° C.] |
|---|---|
| V21 | 145.2 |
| E22 | 145.0 |
| E23 | 144.0 |
| E24 | 143.3 |

The examples show that in most cases addition of the additives markedly reduces the total transmission Ty (ΔTy negative). Only addition of PMMA (A4), as also described in DE 60116498 T2, causes transmission to be slightly increased. However, transmission in the range from 360-460 nm is reduced. This is disadvantageous especially for LED applications since the LEDs normally used in the described applications provide the most energy precisely in this spectral range. A greater absorption in this range results in poorer long-term performance.

Additive A1 is known as a flow auxiliary. Improved flowability in principle makes it possible to reduce damage during thermal processing in extruders or injection molding machines since reduced shear forces are applied. It was therefore surprising that no improvement in terms of transmission and yellowness index was achievable using this additive.

Low molecular weight additives such as A3 can likewise increase flowability but without having a positive effect on the optical properties in the relevant transmission range.

Like additive A6, additive A5 has a demolding effect. However, a further addition of A6 as demolding agent has no significant effect or leads to significantly reduced transmission at 380 nm while, surprisingly, the use of A5 even in small amounts leads to an improvement in the optical properties, especially in the relevant transmission range.

Only in the inventive examples do the total transmission Ty and the transmission in the range from 360 nm to 460 nm increase while, at the same time, yellowness index and haze are also reduced compared to reference example 1V, i.e. a corresponding polycarbonate composition without squalane.

The invention claimed is:

1. An LED illumination unit comprising an LED light source having a peak wavelength in the range from 360 to 460 nm and a molded part made of a transparent or translucent thermoplastic composition containing
    a) thermoplastic polymer, wherein aromatic polycarbonate is present as thermoplastic polymer,
    b) 10-2500 ppm of one or more phosphorus-based stabilizers, selected from the group consisting of phosphates, phosphites, phosphonites, phosphines and mixtures thereof,
    c) 200 ppm to 4500 ppm of one or more branched aliphatic hydrocarbons, wherein squalane is present as branched aliphatic hydrocarbon,
    d) 100 ppm to 4000 ppm of one or more demolding agents based on a fatty acid ester,
    e) 0 ppm to 1000 ppm of one or more phenolic antioxidants,
    f) 0 ppm to 6000 ppm of one or more UV absorbers and
    g) 0 ppm to 50 000 ppm of one or more further additives, wherein the reported amounts in ppm are in each case based on the total weight of thermoplastic polymer of component a.

2. The LED illumination unit as claimed in claim 1, wherein the number of carbon atoms comprised by the hydrocarbon(s) of component c is 20 to 80 and methyl groups are present as branchings.

3. The LED illumination unit as claimed in claim 2, wherein the weight fraction of methyl groups present as branchings is 10% to 30% by weight based on the carbon atoms in the chain.

4. The LED illumination unit as claimed in claim 1, wherein the hydrocarbon(s) of component c are constructed from coupled farnesane units.

5. The LED illumination unit as claimed in claim 1, wherein at least triphenylphosphine is present as heat stabilizer of component b.

6. The LED illumination unit as claimed in claim 1, wherein at least glycerol monostearate is present as demoulding agent of component d.

7. The LED lighting unit as claimed in claim 1, wherein the composition additionally contains a phenolic antioxidant in an amount of 50 ppm to 1000 ppm.

8. The LED lighting unit as claimed in claim 1, wherein the amount of component b is 200 to 1000 ppm and the amount of component d) is 150 bis 500 ppm.

9. The LED lighting unit as claimed in claim 1, wherein the light emitted by the LED lighting unit has a color temperature determined according to DIN EN 12665:2009 of 2500 K to 7000 K.

10. The LED lighting unit as claimed in claim 1, wherein the thermoplastic composition consists of
a) aromatic polycarbonate,
b) 10-2500 ppm of one or more phosphorus-based heat stabilizers, selected from the group consisting of phosphates, phosphites, phosphonites, phosphines and mixtures thereof,
c) 200 ppm to 4500 ppm of one or more branched aliphatic hydrocarbons, wherein squalane is present as branched aliphatic hydrocarbon,
d) 100 ppm to 4000 ppm of one or more demolding agents based on a fatty acid ester,
e) 0 to 1000 ppm of one or more phenolic antioxidants,
f) 0 ppm to 6000 ppm of one or more UV absorbers,
g) 0 ppm to 500 000 ppm of one or more further additives selected from the group consisting of antioxidants distinct from component e, mold release agents distinct from component d, flame retardants, anti-drip agents, stabilizers distinct from component b, optical brighteners, light scattering agents, colorants,
wherein the reported amounts in ppm are in each case based on the total weight of thermoplastic aromatic polycarbonate.

11. A method comprising utilizing branched aliphatic hydrocarbons and increasing light transmission in the range from 360 to 460 nm of a thermoplastic composition based on a thermoplastic polymer.

12. The method as claimed in claim 11, wherein aromatic polycarbonate is present in the composition as thermoplastic polymer and squalane is employed as branched aliphatic hydrocarbon.

* * * * *